(12) United States Patent
Bian et al.

(10) Patent No.: US 6,187,408 B1
(45) Date of Patent: Feb. 13, 2001

(54) THIN FILM MAGNETIC DISK WITH COPTCRB LAYER

(75) Inventors: Xiaoping Bian, San Jose; Mary Frances Doerner, Santa Cruz; Mohammad Taghi Mirzamaani, San Jose; Timothy Martin Reith, Morgan Hill, all of CA (US)

(73) Assignee: International Business Machines Corporation, Armonk, NY (US)

( * ) Notice: Under 35 U.S.C. 154(b), the term of this patent shall be extended for 0 days.

(21) Appl. No.: 08/838,376

(22) Filed: Apr. 8, 1997

(51) Int. Cl.$^7$ ............................................. G11B 5/66
(52) U.S. Cl. .................. 428/65.3; 428/65.7; 428/694 T; 428/694 TS; 428/336; 428/900; 204/192.2
(58) Field of Search ................... 428/694 T, 694 TS, 428/900, 336, 65.7, 65.3; 204/192.2

(56) References Cited

U.S. PATENT DOCUMENTS

| | | | |
|---|---|---|---|
| 4,245,008 | 1/1981 | Michaelsen et al. | 428/611 |
| 4,833,020 | * 5/1989 | Shiroishi | 428/336 |
| 5,523,173 | 6/1996 | Doerner et al. | 428/611 |
| 5,631,094 | * 5/1997 | Ronjou et al. | 428/611 |

OTHER PUBLICATIONS

L–L. Lee, et al Seed Layer Induced (002) Crystallographic Texture in NiAL Underlayers, J. Appl. Phys. 79(8) Apr. 15, 1996.*

"Seed Layer Induced (002) Crystallographic Texture in NiA1 Underlayers" by Li–Lien Lee et al J. Appl. Phys. 79(8), Apr. 15, 1996 p. 4902ff.

"Reduction of Co–Cr–Pt Media Noise by Addition of Ti to Cr Underlayer" by Y. Matsuda, J. Appl. Phys. 79 (8). Apr. 15, 1996 pp. 5351–53.

"Magnetic and Recording Characteristics of Cr, Ta, W and Zr Pre–coated Glass Disks" by Hiroyuki Kataoka et al IEEE Trans. Mag. 31 (6), Nov. 1995, p. 2734ff.

* cited by examiner

Primary Examiner—Leszek Kiliman
(74) Attorney, Agent, or Firm—G. Marlin Knight

(57) ABSTRACT

A thin film magnetic disk (and a disk drive using the magnetic disk) with improved recording performance having a thin seed layer consisting of tantalum (Ta), a suitable underlayer and a CoPtCrB magnetic layer is described. The underlayer is preferably a Cr alloy with a grain size which is smaller than that of pure Cr. CrTi is suitable as an underlayer. An appropriate overcoat such as hydrogenated carbon can be applied.

22 Claims, 1 Drawing Sheet

THIN FILM MAGNETIC DISK WITH COPTCRB LAYER

FIELD OF THE INVENTION

This invention relates to the field of data storage devices such as disk drives having thin film magnetic disks. More particularly the invention relates to combinations of seed layers, underlayers and magnetic layers for thin film magnetic disks.

BACKGROUND

The thin film magnetic recording disk in a conventional hard disk drive assembly typically consists of a rigid substrate, an underlayer of chromium (Cr) or a Cr-alloy, a cobalt-based magnetic alloy deposited on the underlayer, and a protective overcoat over the magnetic layer. A variety of disk substrates such as NiP-coated Al—Mg, glass, glass ceramic, glassy carbon, etc., have been used. The microstructural parameters of the magnetic layer, i.e., crystallographic preferred orientation, grain size and magnetic exchange decoupling between the grains, play key roles in controlling the recording characteristics of the disk. The Cr underlayer is mainly used to control such microstructural parameters as orientation and grain size of the cobalt-based magnetic alloy. When the Cr underlayer is deposited at elevated temperature (>150 C.) on a NiP-coated Al—Mg substrate a [200] preferred orientation (PO) is usually formed. This PO promotes the epitaxial growth of [1120] of the cobalt (Co) alloy, thereby improving the in-plane magnetic performance of the disk.

The use of glass substrates gives improved shock resistance and allows thinner substrates to be used. However, it is often observed that media fabricated on glass substrates have higher noise compared with those made on NiP-coated Al—Mg substrates under identical deposition conditions. The reason is that the nucleation and growth of Cr or Cr-alloy underlayers on glass and most non-metallic substrates differ significantly from those on NiP-coated Al—Mg substrate. It is for this reason that the use of an initial layer on the substrate called a seed layer has been proposed. The seed layer is formed between the alternate substrate and the underlayer in order to control nucleation and growth of the Cr underlayer and, therefore, the magnetic layers. Several materials have been proposed in the prior art as candidates for seed layers such as: Al, Cr, Ti, $Ni_3P$, MgO, Ta, C, W, Zr, AlN and NiAl on glass and non-metallic substrates. (See for example, Seed Layer induced (002) crystallographic texture in NiAl underlayers, Lee, et al., J. Appl. Phys. 79(8), April 1996, p.4902ff).

In order to control nucleation and growth of the Cr underlayer on glass (or alternate substrates), a variety of seed layers have been reported. H. Kataoka, et al., have reported that the deposition of a tantalum seed layer on glass substrates promotes the [200] orientation in the Cr underlayer which, in turn, promotes the [1120] orientation in the magnetic layer. (IEEE Trans. Mag. 31(6), Nov. 1995, p.2734ff). They compared Cr, Ta, W and Zr for use as seed layers using a fixed underlayer and magnetic layer. The magnetic alloy used in their study was a 27 nm thick ternary CoPtCr alloy. The underlayer was CrTi and was 100 nm thick. The purpose of adding Ti was to increase the lattice spacing for optimum matching with CoCrPt.

One method for improving the recording performance of a magnetic disk medium is the use of a CrTi underlayer, which was suggested by Michealsen, et al. in U.S. Pat. No. 4,245,008. Matsuda, et al., also reported that the addition of Ti to Cr increases the lattice parameters of the Cr to enhance the epitaxial growth of the magnetic layer. (J. Appl. Phys. 79, pp. 5351–53 (1996)). They have also reported that the grain size of CrTi underlayer decreases with increasing the Ti concentration. It should be noted that although sputtered Ti has usually a very small grain size, it is not suitable for use as an underlayer or a seed layer as it promotes the <0001> orientation in the magnetic layer, thereby making it unsuitable for longitudinal recording.

One quaternary alloy which has been proposed for use as a magnetic layer is CoPtCrB. A method of depositing the CoPtCrB alloy is specified in commonly assigned U.S. Pat. No. 5,523,173. The '173 patent describes sputter depositing a chromium or chromium alloy underlayer on a substrate in such a way to achieve a strong [200] crystallographic orientation of the underlayer to achieve a low noise, high coercivity medium. This orientation is achieved by depositing the underlayer on a negatively biased substrate under high temperature, low pressure conditions. The oriented underlayer prevents the subsequently deposited CoPtCrB alloy from orienting itself in its preferred, c-axis vertical orientation. The '173 patent specifies that the CoPtCrB alloy should comprise 4 to 12 at % platinum, 18 to 23 at % chromium and 2 to 10 at % boron. However, the optimum performance of the CoPtCrB on glass substrates is not easily obtained for two major reasons. Firstly, nucleation and growth of the Cr underlayer differ from those of the NiP coated AlMg substrates. In fact, Cr tends to grow with a [110] orientation on glass at T<300 C. This is an undesirable orientation in that it can induce perpendicular anisotropy in the magnetic layer. Secondly, application of bias during deposition of Cr is problematic because glass and most alternative substrates are not conductive.

SUMMARY OF THE INVENTION

The present invention is a thin film magnetic disk (and a disk drive using the magnetic disk) with improved recording performance having a thin seed layer consisting of tantalum (Ta), a suitable underlayer and a CoPtCrB magnetic layer. The underlayer is preferably a Cr alloy with a grain size which is smaller than that of pure Cr. CrTi is suitable as an underlayer. An appropriate overcoat such as hydrogenated carbon can be applied.

DETAILED DESCRIPTION OF THE PREFERRED EMBODIMENTS

Figure 1:
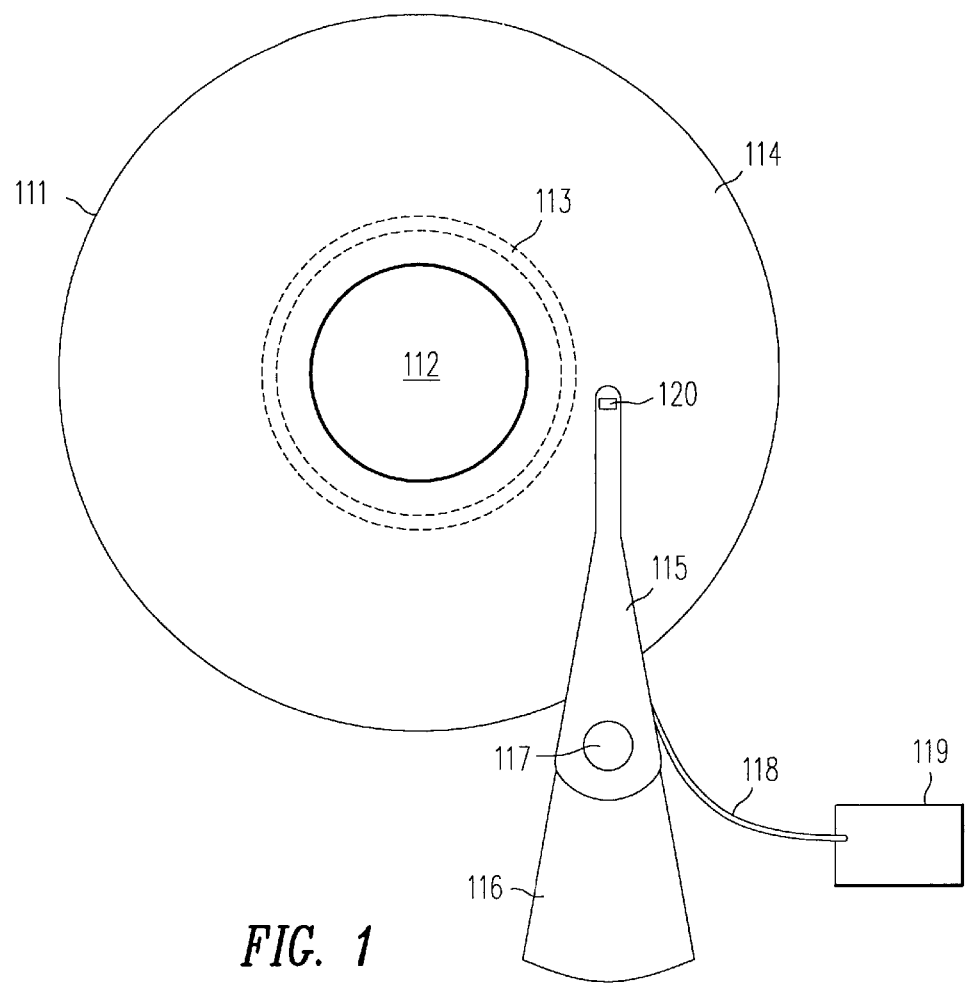
FIG. 1 illustrates a top view of a prior art disk drive with a rotary actuator useful in practicing the present invention.

FIG. 1 is a top view illustrating a prior art disk drive with a rotary actuator useful in practicing the present invention. The system comprises one or more magnetic recording disks 111 mounted on spindle 112 which is rotated by an in-hub electrical motor (not shown). An actuator assembly 115 supports a slider 120 which contains one or more read/write heads. The assembly may be composed of a plurality of actuators and sliders arranged in a vertical stack with the actuators supporting the sliders in contact with the surfaces of the disks when the disks are not rotating or being unloaded to avoid contact. A voice coil motor (VCM) 116 moves the actuator assembly 115 relative to the disks by causing the assembly to pivot around shaft 117. The heads are typically contained in air bearing sliders adapted for flying above the surface of the disks when rotating at sufficient speed. In operation, when the sliders are flying above the disks the VCM moves the sliders in an arcuate path across the disks allowing the heads to be positioned to read and write from circular tracks formed in the data area 114 which is coated with the thin films which will be described in more detail below. Electrical signals to and from the heads and the VCM are carried by a flex cable 118 to the drive electronics 119. When not operating and during periods when the rotation of the disks is either starting or stopping, the sliders may be positioned in physical contact with the surface of the disks in a landing zone or contact start/stop (CSS) area 113 which is not used for data storage even though the magnetic coating extends over this area. It is also known to remove the sliders from the disks during nonoperating periods using an unload ramp. Although the disk drive has been described with air bearing sliders the disk of the present invention may easily be used in other storage devices having near contact, or contact recording sliders.

Figure 2:
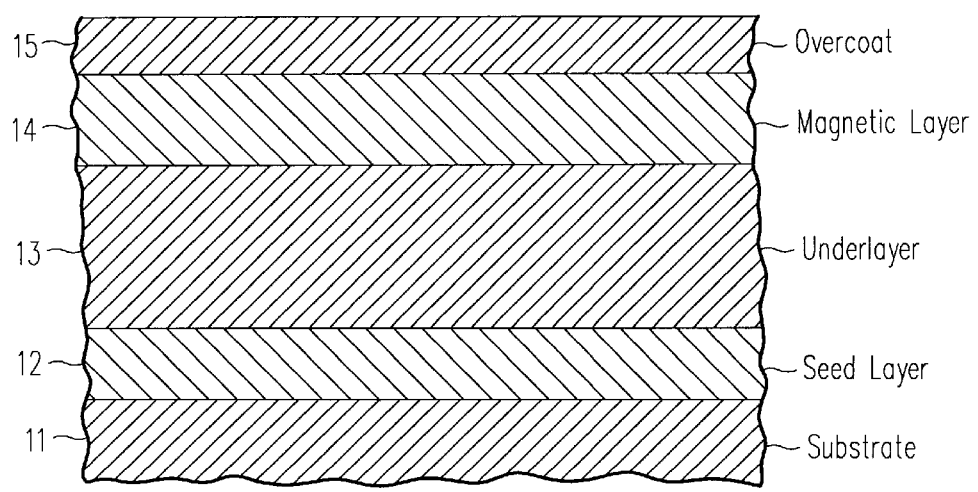
FIG. 2 illustrates the layer structure of a thin film magnetic disk according to the invention.

FIG. 2 illustrates the cross sectional layer structure of a thin film magnetic disk according to the invention which will be coated onto at least one and preferably both planar surfaces of the disk to form the data recording area. The shading is used only to differentiate the layers and not to indicate color or specific composition. The substrate 11 is preferably made of glass or a comparable material. The Ta seed layer 12 is deposited directly onto the substrate. The underlayer 13 is deposited onto the seed layer. The ferromagnetic layer 14 is an alloy of cobalt, platinum, chromium and boron (CoPtCrB). The CoPtCrB alloy should preferably comprise 4 to 12 at .% platinum, 18 to 23 at % chromium and 2 to 10 at % boron. The top layer is a protective overcoat 15 which could be carbon, hydrogenated carbon or any other protective material. The various layers are preferably sputter deposited using standard techniques, targets, temperatures and pressures.

The relative thicknesses of the layers are not believed to be critical for practicing the invention, but the following ranges are given as guidance. The seed layer is preferably from 5 to 30 nm thick. Underlayers are typically much thicker than the seed layer, but wide variations in the thickness of the underlayer result in only small changes in the magnetic characteristics of the disk. A typical value for the thickness of the underlayer is 50 nm. The ferromagnetic layer is typically from 10–30 nm thick. The use, composition and thickness of the overcoat are not important in practicing the invention, but a typical thin film disk might use an overcoat less than 15 nm thick.

The underlayer is preferably CrTi, but other suitable chromium alloys may be used. The CrTi underlayer composition is preferably 5–25 atomic percent (at %) Ti and the balance Cr. The addition of Ti serves as a grain refiner while providing a suitable lattice match with the CoPtCrB.

The preferred Ta/CrTi/CoPtCrB layer structure of the invention provides superior performance of the magnetic disk compared to other combinations. The contributions of the individual layers to the overall performance is believed to be as follows. The seed layer of Ta promotes the [200] orientation in the underlayer. The CrTi alloy underlayer induces smaller grains and higher in-plane anisotropy in the subsequent magnetic layer. The quaternary alloy of CoPtCrB aids in obtaining high Hc and low noise. The superior performance of the combination of these materials is not attributable to simply summing the individual properties as the data below will show. The discovery of the superiority of the Ta/CrTi/CoPtCrB layer structure on glass is particularly interesting when it is noted that on metal (e.g. NiP) the CoPtCrB magnetic alloy performs best with a Cr underlayer.

One measure of merit for a magnetic disk is the signal to noise ratio (SNR). High SNR implies low noise. SNR is related to the magnetic grain size and the degree of magnetic coupling between grains in the thin film. The use of the Ta/CrTi/CoPtCrB layers improves SNR over other combinations. Tables 1 and 2 give coercivity (Hc), magnetic remanence thickness product (Mrt) and SNR for combinations of layer materials deposited on glass substrates using similar sputtering parameters. The measurements were at 4000 fr/mm for Table 1 and 8000 fr/mm for Table 2.

TABLE 1

| Seed/Underlayer/Magnetic | Hc Oe | Mrt memu/cm$^2$ | SNR db @4000 fr/mm |
|---|---|---|---|
| Ta/Cr/CoPt14Cr22 | 1422 | 0.7 | — |
| Ta/Cr/CoPt8Cr20B6 | 2216 | 0.7 | 30.9 |
| Ta/CrV20/CoPt8Cr20B6 | 2313 | 0.71 | 31.5 |
| Ta/CrTi10/CoPt8Cr20B6 | 2276 | 0.7 | 36 |

Note: The numbers following the elements represent at .% composition.

TABLE 2

| Seed/Underlayer/Magnetic | Hc Oe | Mrt memu/cm$^2$ | SNR db @8000 fr/mm |
|---|---|---|---|
| Ta/Cr/CoPt8Cr20B6 | 2296 | 0.6 | 24.8 |
| Ta/Cr/CoPt9Cr18Ta3 | 2293 | 0.62 | 29.6 |
| Ta/CrTi10/CoPt9Cr18Ta3 | 2519 | 0.69 | 29.9 |
| Ta/CrTi10/CoPt8Cr20B6 | 2411 | 0.63 | 30.5 |

Note: The numbers following the elements represent at .% composition.

In Table 1 it is noted that CoPtCrB alloy gives rise to a significantly higher Hc than CoPtCr even with identical Ta/Cr layers. Significantly lower noise (higher SNR) with CoPtCrB was obtained with the CrTi underlayer than with a Cr or CrV underlayer even when the same Ta seed layer was used. The fact that the improvement is seen with CrTi and not with Cr or CrV re-enforces the hypothesis that it is the reduced grain size that is the critical feature of the underlayer. The combined use of a Ta seed layer, CrTi underlayer and quaternary CoPtCrB magnetic layer yielded the high Hc, low noise result which is beneficial for improved high density recording. The recording performance data of a second series of disks with lower Mrt and higher Hc are listed in Table 2. It is seen that the optimized performance is achieved when the CrTi underlayer is used.

While the compositions listed above have been given without regard to contamination percentages, it is known to those skilled in the art that some contamination is normally if not always present in thin films. Targets are typically specified as 99.9% or greater purity, but the resulting films may have much lower purity due to contamination in the sputtering chamber or other factors. For example, contamination by air in the chambers might result in measurable amounts of oxygen and/or hydrogen being incorporated into the film. For some carbon films 5 at % hydrogen contamination has been measured in a typical sputtered layer. Contamination levels were not specifically measured in the disk samples described and, therefore, were assumed to be within normal ranges for sputtered thin film disks expected by those skilled in the art.

The thin film disk made according to the invention can be used for storing data in typical disk drives using either magnetoresistive or inductive heads and can be used in contact recording or with flyable heads. The read/write head is positioned over the rotating disk in the standard manner to either record or read data.

While the preferred embodiments of the present invention have been illustrated in detail, it will be apparent to the one skilled in the art that alternative embodiments of the invention are realizable without deviating from the scope and spirit of the invention.

What is claimed is:

1. A thin film magnetic disk comprising:
   a substrate;
   a seed layer comprising tantalum deposited onto the substrate;
   an underlayer comprising an alloy of chromium deposited onto the seed layer; and
   a magnetic layer comprising cobalt, platinum, chromium and boron deposited onto the underlayer.

2. The disk of claim 1 wherein the seed layer is between 5 and 30 nm in thickness.

3. The disk of claim 1 wherein the underlayer comprises CrTi.

4. The disk of claim 3 wherein the underlayer contains greater than 5 at % Ti with the remainder being predominantly Cr.

5. The disk of claim 1 wherein the substrate comprises a non-metallic material.

6. The disk of claim 1 wherein the magnetic layer comprises 4 to 12 at % platinum, 18 to 23 at % chromium and 2 to 10 at % boron.

7. The disk of claim 1 wherein the substrate comprises glass, the underlaver is CrV and the seed layer is between 5 and 30 nm in thickness.

8. The disk of claim 7 wherein the underlayer contains greater than 5 at % Ti with the remainder being predominantly Cr and the magnetic layer comprises 4 to 12 at % platinum, 18 to 23 at .% chromium and 2 to 10 at % boron.

9. The disk of claim 1 wherein the substrate comprises glass.

10. The disk of claim 1 further comprising a hydrogenated carbon overcoat.

11. A disk drive comprising:
    a thin film magnetic disk including:
      a substrate;
      a Ta seed layer
      an Cr alloy underlayer; and
      a CoPtCrB magnetic layer;
    means for rotating the thin film magnetic disk;
    a slider containing means for reading magnetic data; and
    means for positioning the slider over the thin film magnetic disk to read magnetic data from the disk.

12. The disk drive of claim 11 wherein the seed layer is between 5 and 30 nm in thickness and the underlayer is CrV.

13. The disk drive of claim 11 wherein the underlayer contains greater than 5 at % titanium with the remainder being predominantly Cr.

14. The disk drive of claim 11 wherein the substrate comprises a non-metallic material.

15. The disk drive of claim 14 wherein the underlayer contains greater than 5 at % Ti with the remainder being predominantly Cr and the magnetic layer comprises 4 to 12 at % platinum, 18 to 23 at % chromium and 2 to 10 at % boron.

16. The disk drive of claim 11 wherein the magnetic layer comprises 4 to 12 at % platinum, 18 to 23 at % chromium and 2 to 10 at % boron.

17. The disk drive of claim 11 wherein the substrate comprises glass.

18. The disk drive of claim 11 wherein the substrate comprises glass and the seed layer is between 5 and 30 nm in thickness.

19. A method of manufacturing a thin film disk comprising the steps of:
    sputtering a Ta seed layer onto a glass substrate;
    sputtering a chromium alloy underlayer onto the seed layer; and
    sputtering a magnetic alloy onto the underlayer comprising cobalt, platinum, chromium, and boron.

20. The method of claim 19 wherein the Ta seed layer is from 5 to 30 nm thick.

21. The method of claim 19 wherein the underlayer contains greater than 5 at % Ti with the remainder being predominantly Cr and the magnetic layer comprises 4 to 12 at % platinum, 18 to 23 at % chromium and 2 to 10 at % boron.

22. The method of claim 19 wherein the magnetic layer is from 10 to 30 nm thick.

* * * * *